United States Patent
Vazquez et al.

(10) Patent No.: US 9,902,827 B2
(45) Date of Patent: Feb. 27, 2018

(54) METHOD FOR CONTINUOUSLY PREPARING SOLVENT-FREE OPEN-CELL AND CLOSED-CELL POLYIMIDE FOAMS

(71) Applicant: Changzhou Tiansheng New Materials Co., Ltd., Changzhou (CN)

(72) Inventors: Juan Miguel Vazquez, Changzhou (CN); Shengliang Chen, Changzhou (CN); Wenguang Ma, Changzhou (CN); Jian Wang, Changzhou (CN)

(73) Assignee: CHANGZHOU TIANSHENG NEW MATERIALS CO., LTD., Jiangsu (CN)

( * ) Notice: Subject to any disclaimer, the term of this patent is extended or adjusted under 35 U.S.C. 154(b) by 129 days.

(21) Appl. No.: 14/443,235

(22) PCT Filed: May 28, 2014

(86) PCT No.: PCT/CN2014/078629
§ 371 (c)(1),
(2) Date: May 15, 2015

(87) PCT Pub. No.: WO2015/180063
PCT Pub. Date: Dec. 3, 2015

(65) Prior Publication Data
US 2016/0272775 A1 Sep. 22, 2016

(51) Int. Cl.
*C08J 9/02* (2006.01)
*C08G 73/06* (2006.01)
*C08G 73/10* (2006.01)
*C08J 9/14* (2006.01)

(52) U.S. Cl.
CPC .............. *C08J 9/02* (2013.01); *C08G 73/06* (2013.01); *C08G 73/10* (2013.01); *C08J 9/14* (2013.01); *C08J 2201/026* (2013.01); *C08J 2203/02* (2013.01); *C08J 2203/06* (2013.01); *C08J 2203/10* (2013.01); *C08J 2203/12* (2013.01); *C08J 2203/142* (2013.01); *C08J 2205/05* (2013.01); *C08J 2205/052* (2013.01); *C08J 2205/10* (2013.01); *C08J 2379/08* (2013.01)

(58) Field of Classification Search
CPC .. C08G 73/06; C08G 73/10; C08J 9/02; C08J 9/14; C08J 2201/026; C08J 2203/02; C08J 2203/06; C08J 2203/10; C08J 2203/12; C08J 2203/142; C08J 2205/05; C08J 2203/052; C08J 2379/08
See application file for complete search history.

(56) References Cited

U.S. PATENT DOCUMENTS 4,738,990 A * 4/1988 Nelb, II ............... C08G 18/168
521/107
6,956,066 B2 * 10/2005 Vazquez .............. C08G 18/346
521/119

* cited by examiner

*Primary Examiner* — John Cooney
(74) *Attorney, Agent, or Firm* — Shimokaji IP

(57) ABSTRACT

A method for continuously preparing solvent-free open-cell and closed-cell polyimide foams, firstly, one or a few of dianhydrides dissolve in or suspend in the polyhydric alcohol and form the precursor A. All kinds of additives dissolve in the polyhydric alcohol and form the precursor B. The aromatic isocyanates with different structure mix well and form the precursor C. Finally the three precursors are mixed foaming by one-step, after solidify, the polyimide foams are obtained with advantage performance. The method does not utilize the volatile solvent that does not participate in the reaction, therefore not existing the process of removing the solvent, it can continuously produce with the double-side heat conveyor belt. $CO_2$, the main gas producing in the reaction, causes the system to foam, thus there is no cost on the solvent recovery and it reduces the environment contamination.

12 Claims, 2 Drawing Sheets

U.S. 9,902,827 B2

METHOD FOR CONTINUOUSLY PREPARING SOLVENT-FREE OPEN-CELL AND CLOSED-CELL POLYIMIDE FOAMS

FIELD OF THE INVENTION

The present invention relates to the polyimide technical field, more particularly to a method for continuously preparing solvent-free open-cell and closed-cell polyimide foams.

BACKGROUND OF THE INVENTION

Polyimide is a kind of polymer containing imide group in the main chain; the phthalimide structure embedded in the chain has drawn the most attention. As a kind of special engineering material, the polyimide has been widely applied in aviation, aerospace, microelectronics, nanomaterial, liquid crystal display, separation membrane, laser, etc. Recently polyimide has been listed as one of the most promising engineering plastics in the 21st century by many countries. No matter as structural material or as functional material, the great application prospect of polyimide has been well understood, it was called "protion solver", and it has been considered that "there will be no today's microelectronics without the polyimide"

Therein the polyimide foams have advantages of good fireproof performance, low smoke density index and good thermal insulating property. Thanks to these properties polyimide foams have been widely applied in aviation, aerospace, marine, and transportation, etc. And they also can be used in civil building for sound and heat isolation purpose. However the application is limited because of high preparation cost and complex process.

There are two main methods for preparing the polyimide foams: one is that polyimide foams are synthesized from aromatic dianhydride and aromatic diamine by two-step synthesis; the other method is that aromatic dianhydride directly reacts with the isocyanate to produce polyimide foams.

The first method consists of two stages: in the first stage dianhydride reacts with diamine by way of condensation polymerization in polar solvent, thereby forming solution. At low temperature the volatile solvent is heated to evaporate and the solution's viscosity increase, to even form solid. The remaining solvent from the products above is working as foaming agent. The second stage is to remove the water which is produced in reaction and the alcohol at high temperature; the imidization reaction happens during the heat treatment stage, associating by solvent evaporation. The shortage of the two-step method is very obvious: the reaction goes very slowly; the equipment and the process are very complex; so the preparation cost is very high; the solvent used is not friendly to the environment.

In the second method, an aromatic dianhydride is firstly dissolved in a high boiling point solvent. The solution then quickly reacts with the isocyanate to form the polyimide foams. In this method, a high boiling point solvent is necessary; the density of the products cannot be well controlled; also it is impossible to produce the foam in a continuous way.

The method as discussed in CN101812232A utilized the aromatic dianhydride or aromatic tetracid, isocyanate and foaming agent, etc. to immediately react in a polar solvent, thereby cure into polyimide foam. The patent utilized high boiling polar solvent such as N,N-dimethylacetamide. However the process is only suitable for intermittent production.

Patent CN102127225A disclosed another method for producing the rigid polyimide foams. Aromatic dianhydride or aromatic ester reacted with polyhydric alcohol in polar solvent, thereby forming polyimide foams precursor which would react with isocyanates in a mould forming polyimide foam intermediately. Rigid polyimide foams are obtained after the intermediate is cured by doing heat treatment in microwave. In this patent, since the solvent is not involved in the reaction process, it needed to be removed. The process is relatively complex.

Patent CN102942668A disclosed a method for producing the polyimide composite material by filling the functional filler. The method employed aromatic dianhydride or aromatic diamine. After aromatic dianhydride is esterified, promoters, such as catalyst, foaming agent and functional filler, are added, thereby forming the precursor solution. Then the precursor solution reacted with isocyanate to produce polyimide foams. In this method the solvent doesn't participate in reaction process and needed to be removed. Microwave or heat treatment process is employed during solidification. The process is relatively complex and cannot satisfy the requirement of continuous production.

SUMMARY OF THE INVENTION

In order to resolve problems above, the object of the invention is to provide a method for continuously producing solvent-free open-cell and closed-cell polyimide foams. The method does not utilize none-reacting volatile solvent in the process, instead of gaseous $CO_2$ produced in the reaction acts as foaming agent. This process also can be accomplished by double heating conveyer belt process. Based on this method, the cost of the solvent recovery is free and environment contamination is reduced, meanwhile the cost is remarkably reduced and the industrialized continuous production is achieved.

The technical methods in this invention are as follows:

A method for continuously producing of solvent-free open-cell or closed-cell polyimide foams:

(1) Preparation of Precursors

The preparation of the precursor A: firstly heat polyols and a small amount of assisting solvent to 50±5° C. in a reactor, then add aromatic dianhydride and mix them thoroughly, then increase inner temperature of reactor and keep the temperature until polar assisting solvent therein completely volatilizing, and finally precursor A is obtained; the quantity of aromatic dianhydride used is 75~150% of polyol. The physical state of the precursors has big influence on final product. Under the optimal condition, the system temperature increases to 140° C.~180° C. (which is always lower than the boiling point or the decomposition temperature of polyols). The temperature is maintained until the polar assisting solvent completely volatilizing. In order to mix dianhydride thoroughly in polyols and avoid crystallization and agglomered phenomenon during cooling, preferably an ultrasonic mixing is applied (frequency 20~40 KHz) as mixing and dispersing method.

The preparation of the precursor B: based on the mass portion, 100 portions of polyethylene glycol, 20~200 portions of water and 2~30 portions of surfactant are mixed well, and then the precursor B is obtained; the other catalysts and the other surfactants with the same function also can be employed as substitutes. The assisting solvent helps dispersion of solid material. Similarly the selection of surfactant, which has anti-flocculating function in preparation process, is also very important. The use of the surfactant depends on the selection of dianhydride or mixture dianhydride. According to different functional groups, the kinds of the surfactant can be different: nonionic, anionic and cationic.

In a formula of preparing low density PI foams, it is important to use a certain amount of water. Water cannot be added into precursor A, because in the process, the water reacts exothermically with dianhydride resulting in a low content of imide group which has great influence on the heat resistance, the smoke density and the water resistance of the final foam products. In the process of preparing precursor B, it is prefer to use polyethylene glycol (PEG-600) as carrier of water and other catalyst that can not be mixed with acid medium (precursor A). During foaming process, precursor B, precursor A and isocyanate will be simultaneously stirred and react with each other.

Precursor C is produced from isocyanates. One or more kinds of isocyanate can be employed based on the performance requirements of the foams. There are four kinds of isocyanate can be taken into account: Diphenyl-methane-diisocyanate (MDI), Toluene diisocyanate (TDI), 1,6-Diisocyanatohexane (HDI) and isophorone diisocyanate (IPDI). MDI is preferred as the main portion of precursor C. MDI is an isocyanate with aromaticity and has three kinds of isomers: 2,2'-MDI, 2,4'-MDI and 4,4'-MDI. The last one is employed most widely, usually as forms of purity monomer or polymer. To produce rigid or semi-rigid foams, 50~90% pure MDI is mixed with 10~50% different polymerized MDI to obtain mixture solution. If severe light exposure is required, 20~50% IPDAI is preferred. If product is supposed to be soft foam, 65~90% MDI is mixed with 10~35% HDI. 15% HDI is preferable because it does not affect the high temperature resistance and the smoke density of foams.

Among all of the optional materials, we can preferably use the pure MDI from Huntsman company, including Rubinate™ M poly MDI (pMDI), Rubinate™ 1850 pMDI, Rubinate™ 1680 pMDI; we select Mondur™ 445 (TDI/MDImixtures), Mondur™ 448 pMDI from the catalog of Bayer company; and from the catalog of the Dow Chemical Company (Dow), we select HYPOL™ G-50 for producing IPDA precursor, select Voranate™ T-80 precursor for producing TDI precursor, select Durelast™ 505 isocyanate and Papi™ 27 and Papi™ 135type MDI for producing the polymer synthesized HDI precursor.

(2) Foaming

Precursor A, precursor B and precursor C are mixed with mass ratio of 3.1~11.4:1:6.3~14.3, if necessary meanwhile the foaming agent (1~10%) is added to mixture, and then polyimide foams are obtained. The mixing speed is in a range of 1200~2500 rpm before that precursor A is heated to 40° C.~50° C.

(3) Imidization

The mixture, obtained in foaming process by mixing precursor A, precursor B, precursor C, and foaming agent, is injected into the continuous transmission double-side conveyor belt and then cure to obtain polyimide foams.

Preferably, in process of producing precursor A, a low boiling point polar assisting solvent can also be added before aromatic dianhydride. The quality of low boiling point polar assisting solvent is 5~20% of polyols. The assisting solvent is preferably selected from a group consisting of methanol, alcohol, propanol, isopropanol, butanol, isobutanol, pentanol, etc. The first options are alcohol and propanol.

Preferably, in process of preparing the precursor A, the polyols are selected from a group consisting of ethylene glycol, polyethylene glycol, propanediol, glycerol and any combination thereof It needs to select different types of polyol, diol or tribasic alcohol. How to select one or a few kinds of polyols depends on requirements of the performance of polyimide foam. Properties including the smoke density, open porosity, flexible elasticity, density, the highest continuous working temperature (the need of fire-proof material) and other properties that needed in practical application should be taken into account. Priorities are ethylene glycol, polyethylene glycol, propanediol and glycerol. The polyols can be selected from one kind or a mixture of a few kinds. The other polyols with complicated molecular structure also can be used. In market, the multi complex polyols can impart different structure and properties. Among all of the usable polyol we select the Stepanpol 301 from Stepan Company, which has more aromaticity in molecular chain; the polyol Terate 3501 from Invista Companyj which has similar aromaticity with that of Stepanpol.

Preferably, in process of preparing precursor A, aromatic diamine also can be added. The aromatic diamine helps forming crosslinking structure, thereby apparently increasing the mechanical strength and promoting the formation of the microporous foam. The phenomenon happens because aromatic diamine can apparently accelerate the reaction of isocyanate, hydroxyl and amic acid. The crosslinking structure can keep system at high viscous state, thereby helping locking $CO_2$ in the system. The optimum diamine is selected from a group consisting of 4,4'-diamino diphenyl ether (4,4'-ODA), 3,4'-diamino diphenyl ether (3,4'-ODA), m-phenylenediamine (m-PDA), p-phenylenediamine (p-PDA), 1,3-bis (3-aminophenoxy) benzene (3-APB), 4,4'-diaminobenzophenone (4,4'-DABP), 4,4'-diaminodiphenylsulfone (4,4'-DDS) and any combination thereof.

The aromatic dianhydride or precursor of potential aromatic dianhydride is very important for the foaming system. For the precursor, we also can use some tetracids (pyromellitic acid, 3,3',4,4'-benzophenonetetracarboxylic acid, etc.). The aromatic dianhydride can decide the properties of final polyimide foams. The usually used most, but not limited to, includes pyromellitic acid dianhydride (PMDA), 3,3',4,4'-benzophenone tetracarboxylic dianhydride (BTDA), 4,4-Oxydiphthalic dianhydride (ODPA), 3,3',4,4'-biphenyltetracarboxylic dianhydride (BPDA). These aromatic dianhydrides can be used singly; mixture of two or more dianhydride also can be used.

Preferably, in process of preparing precursor B, catalyst is amine catalyst and surfactant is silane. The application of surfactant is very important to the structure of the final foams. The surfactant can emulsify solution, reduce the viscosity and surface tension of the solution, thereby helping to transfer the solution to stable foam.

The silane surfactant is applied widely. The kind of surfactant can efficiently reduce surface tension of the mixture system at foaming stage, thereby obviously benefiting the dispersion and the nucleation of gas. In silane surfactant produced by Air company, the follows can be selected: DABCO DC197, DC198, DC4000, DC5000, DC5143 and DC6154, etc. Of course we also can mix the non-silane surfactant and the silicone oil DC197 from Air company. Series of silane surfactant from EVONIK, such as B8460, B8433, BB8465, BB8481, B8487 and B8513, also can be used. The foam cell, the stability and the dispersion of gas can be adjusted by the silicone surfactant, thereby imparting polyimide foams with greater performance.

In the reaction, the speed of gas generation and solution gelation in the system need to be controlled. If the speed of the gas generation is too the foam will collapse. If the gelation speed is too fast, the large cavity will appear, thereby resulting in a heterogeneous foam cell structure. The existence of the amine can accelerate the gelation reaction and avoid foam collapsing in process of foaming. Among the catalysts produced by Air company, potential amine catalysts include POLYCAT 5, POLYCAT 8, POLYCAT 9, POLYCAT 33, POLYCAT 41, POLYCAT 43, POLYCAT SA-1, DABCO 33-LV, DABCO BL-11 and DABCO TMR. For producing a low density foam, it is better to use aid-foaming catalyst, such as unsym-Dimethylethylenediamine (MDCHA) and N,N-dicyclo-hexylmethylamine (DMBA); the density can reach as low as 5.9 kg/m3. Other metal catalysts, for example, stannous octoate (Dabco t-9), potassium octoate (Dabco k-15) and potassium acetate (Polycat 46), also can be used. These organometallic catalysts are very important because they can help diisocyanate trimerization and avoid cavity appearance by reducing gas.

Preferably, in process of preparing precursor B, one or a few kinds of flame retardant also can be added. The flame retardant is preferably selected from Antiblaze N. Antiblaze 80 or Vircol 82 from Rhodia company.

Thereof, foaming agent used in process of foam is selected from the group consisting of methanol, alcohol, acetone, water, 2-butoxylethanol, and any combination thereof, or from a group consisting of HFC-245A (Enovate), 2-Butoxyethanol, 1,1-difluoroethane, triethylaMine, tetrahydrofuran, and any combination thereof produced by Honeywell. For producing closed-cell foams, the flame retardancy is one of the key properties; therefore the selection of the foaming agent is very important.

Preferably, in foaming process, dynamic mixing in the reactor containing the precursor A should keep running at a speed of 10~30 rpm before mixing the three kinds of precursors together.

Preferably, in the foaming process, after mixing precursor A, precursor B and precursor C together, the mixture is immediately injected into continuous moving double-side conveyor belt. The two belts need to be heated up to a temperature in a range of 180~190° C. Two pieces of kraft paper are fixed on the up-side of the bottom belt and down-side of the top belt respectively; the gap between the up-side and the down-side of the two belts and the length of the conveyor belts can be adjusted according to product requirements. The mixture expands after 2 seconds extruded out from the dynamic mixer, and then needs 25s for finishing expansion.

The invention is disclosed a method for continuously preparing open-cell or closed-cell polyimide foams with different densities. The preparing stage in this method avoids applying polar solvent at the stage of pre-imidization; all of the raw materials will be part of final products, thereby performing a continuous production of polyimide foams. Firstly, one or more dianhydrides dissolve in or suspend in polyol to form the precursor A. The dianhydride will finally become the part of the products. In the suspension, one or a few aromatic diamines can be added. The aromatic diamine can be used as catalyst and will be a part of the product. All kinds of additives dissolve in the polyol and form the precursor B. The aromatic diisocyanate with different structure are mixed well to form the precursor C. Finally three precursors are mixed and foam by one-step process; the polyimide foams with advanced performances are obtained after curing.

The method in this invention can be continuously produced with double belts and can also be intermittently produced with open or closed mould. In process of preparing polyimide foam, the imidization reaction (cyclodehydration) does not need high frequency electromagnetic wave (microwave) treatment. The precursor solutions or suspending solutions are mixed by injection at high temperature, so the imidization reaction can be self-initiating at beginning. The exothermic reaction further increases system temperature, thereby finishing imidization reaction. All kinds of precursor solution or suspending solution are stirred at high speed in the mixer, thereafter are injected on the bottom belt of the heated double belt conveyor on which the imidization reaction will finally finish. The process does not utilize volatile solvent, so process of removing solvent is not needed. At the same time, the gas $CO_2$ produced in reaction as a foaming agent makes the mixture to foam, so the cost of solvent recovery is free, and the environment contamination is reduced.

The intermittent production also can be used for making PI foam in this invention. The difference is that materials are injected into a open or closed mould. If necessary, the mould could be heated in conventional oven to ensure completion of reaction.

The formula and process of this invention also provide the possibility of continuous producing PI foam sandwich panel. Using different continuous skin materials combined with continuous PI foaming process can produce desirably sandwich composite product.

In a word, the equipment for finishing foaming process in this invention are simple that avoids using high frequency equipment; at the same time it employs continuous double belts conveyor, thereby achieving industrial scale and continuous processing the polyimide foams. Especially the method does not use solvent which will volatilize in the foaming process. The whole polyimide precursor will become parts of polyimide foams. The formula without solvent and the continuous process can combine with the continuous reinforcing skin materials to continuously produce the polyimide foam cored sandwich composite products. In this invention diamines can be used. The amino groups will generate after adding the diamines. In this method the precursors are heated up so that polyimide foams are synthesized in one step. In this method the precursors are heated up to synthesize polyimide foams by spraying. The materials are injected into closed mould to finish imidization in one step. The produced foams have excellent flexible elasticity which are suitable for chair cushions of automobile, airplane and other transportations. In the synthesizing method, one or more kinds of polyol are mixed with one or more kinds of dianhydride to produce saturated or unsaturated suspension solution, then the solution reacts with functional groups R—N=C=O to produce the polyimide foams in one-step process. The synthesis method produces the saturated or unsaturated suspension solution by mixing one or more kinds of polyol, One or more kinds of dianhydride and one or more kinds of diamines, which then react with the functional groups R—N=C=O and produce the polyimide foams in the one-step process.

DESCRIPTION OF THE FIGURES

FIG. 2-1 is the magnified diagram of the infared spectrum of the material obtained in embodiment 2.

FIG. 3-1 is the magnified diagram of the infared spectrum of the material obtained in embodiment 3.

FIG. 4-1 is the magnified diagram of the infared spectrum of the material obtained in embodiment 4.

FIG. 1-2a is the 40 times magnified structure diagram of the foam cell of the material obtained in embodiment 1.

FIG. 1-2b is the 100 times magnified structure diagram of the foam cell of the material obtained in embodiment 1.

FIG. 2-2a is the 40 times magnified structure diagram of the foam cell of the material obtained in embodiment 2.

FIG. 2-2b is the 100 times magnified structure diagram of the foam cell of the material obtained in embodiment 2.

FIG. 3-2a is the 40 times magnified structure diagram of the foam cell of the material obtained in embodiment 3.

FIG. 3-2b is the 100 times magnified structure diagram of the foam cell of the material obtained in embodiment 3.

FIG. 4-2a is the 40 times magnified structure diagram of the foam cell of the material obtained in embodiment 2.

FIG. 4-2b is the 100 times magnified structure diagram of the foam cell of the material obtained in embodiment 2.

DETAILED DESCRIPTION OF ILLUSTRATED EMBODIMENTS

Figure 5:
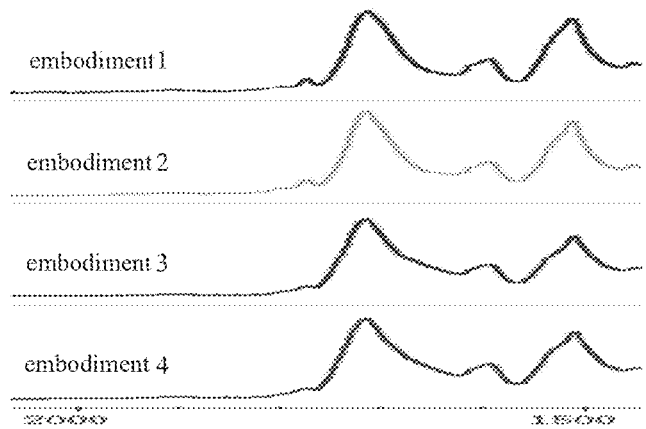
FIG. 5 is the comparison diagram of the infared spectrum of the materials obtained in embodiments 1~4.

The invention will now be further described by referring to the accompanying drawings that illustrate the preferred embodiments, therefore helping those skills in the art to understand the invention.

Embodiment 1

A method for preparing polyimide foams with aromatic polyester polyol.

A precursor A-APP 15,000 grams of Terate type aromatic polyester polyol (APP) produced by Invista company and 1,650 grams of methanol were mixed well. After mixing solution was heated up to 50° C.; 145 grams of Dabco DC-193 and 115 grams of potassium octoate (K-15) were slowly added therein. After 5 minutes, 12500 grams of PMDA were added while stirring. Then the temperature therein was heated up to 140° C. in a heating rate less than 2° C./min. In the period, the producing process was an exothermic reaction which would increase the temperature of system. The temperature of the system would be kept at 140° C. for one hour until the methanol was completely volatiled. In the process of dissolving, the stirring rate should be maintained at 30 rpm. During cooling, the stirring speed should be adjusted to 10 rpm so that solution had high viscosity and transparency.

A Precursor B-APP 1,000 grams of polyethylene glycol (PEG-600) and 40 grams of surfactant Dabco DC-193 were stirred and mixed at room temperature. After stirring for 5 seconds, 25 grams of Polycat SA-102 were added. Polycat SA-102 is a kind of delaying catalyst that begin to work when the system is heated up to 60° C. at the foaming stage. In order to start foaming reaction, 25 grams of catalyst Jeffcat TD-33 from Huntsman Company were employed. In producing process, another important catalyst Dabco T-12 (dibutyltin dilaurate) which could accelerate the gelation reaction and reduce the surface viscosity was also added. The adding amount was 35 grams. After stirring for 10 minutes at 60 rpm, 250 grams of 2-Butoxyethanol were added followed by stirring for 20 minutes at 25 rpm.

A Precursor C-APP

In a closed vessel with nitrogen, 8,000 grams of Rubinate 1860, 3,000 grams of Rubinate M and 1,000 grams of Rubinate 1680 were mixed well at room temperature. Rubinate 1680 was uretoinime modified isocyanate and could increase the elasticity of the final products.

Foaming

Set up the injection device with negative pressure; four independent tanks were respectively filled with A-APP, B-APP, C-APP and cleaning solution. The precursor A-APP was injected at 45° C. For reducing the viscosity of the solution and increasing the fluidity, the solution should be heated up thereby avoiding pressure problem and injecting solution smoothly.

Injection would run for 60 seconds; and mixing speed was 1,250 rpm. After mixing, the materials were injected into continuous transmission double belt conveyor; two pieces of kraft paper were respectively fixed on the up-side and the down-side of the belts. The top and the bottom of the belt need to be heated up to 185° C. The gap between the top and the bottom belts was 31.8 mm with a length of 1,270 mm The mixture expanded after 2 seconds extruded out from the dynamic mixer, and then needed 25s for finishing expansion.

The proportion of precursors:

Precursor A-APP=3,000 g.

Precursor B-APP=365 g.

Precursor C-APP=4,250 g.

Figure 1:
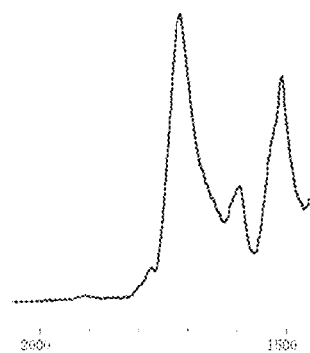
FIG. 1-1 is the magnified diagram of the infared spectrum of the material obtained in embodiment 1.
Figures 1, 2:
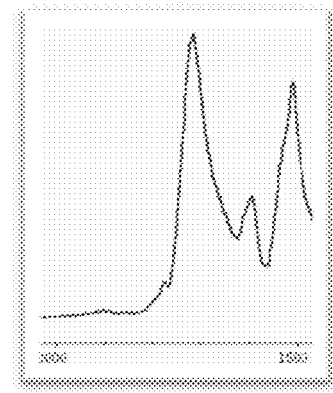

After foams were removed from kraft paper, its final density was 108.8 kg/m$^3$. The rigid foams had quite small pores. The apparent of pores was quite uniform observed from parallel and vertical direction, especially from parallel direction. This could be observed from FIGS. 1-2a and 1-2b. The infrared spectrums (FIGS. 14 and 1-1) showed that foams had been completely imidized.

Embodiment 2

A method for preparing polyimide foams with ethylene glycol.

A Precursor A-MEG-BTDA 15,000 grams of ethylene glycol and 1,650 grams of methanol were mixed well and heated up to 50° C., 145 grams of surfactant Dabco DC-193 and 115 grams of potassium octoate (K-15) were slowly added therein. After 5 minutes, 12,500 grams of 3,3',4,4'-benzophenonetetracarboxylic dianhydride (BTDA) therein were slowly added while stirring. Then the system was slowly heated up to 145° C. in a heating rate less than 2° C./min. In this period, the process was an exothermic reaction while would increase the temperature of the system. The system would be kept at 140° C. for one hour until methanol was completely volatiled. In the process of materials dissolving, the solution should be kept at a stirring speed of 30 rpm all the time. During cooling, the stirring speed should be adjusted to 10 rpm so that the solution had a high viscosity and transparency.

The precursor was named as precursor A-MEG-BTDA to distinguish it from the other precursors produced with different polyols.

1,000 grams of polyethylene glycol (PEG-600) and 40 grams of surfactant Dabco DC-193 were stirred and mixed at room temperature. After stirring for 5s, 25 grams of Polycat SA-102 were added therein. Polycat SA-102 is a kind of delaying catalyst that begins to work when the system is heated up to 60° C. In order to start the foaming reaction, 25 grams of catalyst Dabco T-12 (dibutyl tin dilaurate) were employed, which could accelerate gelation reaction and reduce surface viscosity. The adding amount was 35 grams. After stirring for 10 min at 60 rpm, 250 grams of 2-Butoxyethanol were added after 20 min of stirring at 25 rpm.

A Precursor C-MEG-BTDA

In a closed vessel with nitrogen, 8,000 grams of Rubinate 1860, 3,000 grams of Rubinate M and 1,000 grams of Rubinate 1680 were mixed well at room temperature. Rubinate 1680 is uretoinime modified isocyanate and can increase the elasticity of final products.

Foaming

The concrete process was described in embodiment 1. The temperature of precursor A-APP-BTDA was 22° C.

The injection lasted 60s, and mixing rate was 1,250 rpm. After mixing, the mixture was injected onto continuous transmission double belt conveyor; two pieces of kraft paper were respectively fixed on the up-side and the down-side of beltd; the top and the bottom of belts need to be heated up to 185° C.

The gap between top and bottom of belts was 31.8 mm with a length of 1,270 mm The mixture expands after 2 seconds extruded out from the dynamic mixer, and then needs 35s for finishing expansion.

The proportion of each of the precursors:
Precursor A-APP-BTDA=4150 g.
Precursor B-APP-BTDA=365 g.
Precursor C-APP-BTDA=5200 g.

After foams were removed from kraft paper, the final density was 6.7 kg/m$^3$. The rigid foams had quite small cell. The foams were very flexible; the appearance of cells was quite uniform observed from parallel and vertical direction. This could be observed from FIGS. 2-2a and 2-2b. The infrared spectrums (FIGS. 14 and 2-1) showed that foams had been completely imidized. The cell was half-opening. The foams need to be disposed under negative pressure of 711 mm of mercury for an hour. This would ensure the open-cell structure and increase the size stability. At the same time the negative pressure destroyed cell wall; it also increased sound insulation behavior.

Embodiment 3

A method for producing polyimide foams with ethylene glycol and pyromellitic dianhydride.

A Precursor A-MEG 15,000 grams of ethylene glycol and 1,650 grams of assisting solvent methanol were mixed well and heated up to 50° C., then 145 grams of surfactant Dabco DC-193 and 115 grams of potassium octoate (K-15) were added therein. While stirring, 17,500 grams of pyromellitic dianhydride (PMDA) were slowly added. During dissolving, the exothermic reaction quickly heated the system up to 165° C. After exothermic reaction finished, the heating rate was kept at no more than 2° C./min The solution would be kept at 165° C. for one hour until the methanol completely volatized. In the process of materials dissolving, the stirring speed should be kept at 30 rpm. During cooling, the speed should be adjusted to 10 rpm so that the solution had high viscosity and transparency. The precursor was named as precursor A-MEG in order to distinguish it from other precursors produced with other polyols.

A Precursor B-MEG 1,000 grams of polyethylene glycol (PEG-600) and 40 grams of surfactant Dabco DC-193 were stirred and mixed at room temperature. After stirring for 5 seconds, 25 grams of Polycat SA-102 was added. Polycat SA-102 is a kind of delaying catalyst that begins to work when the system is heated up to 60° C. In order to start the foaming reaction, 25 grams of catalyst Jeffcat TD-33 from Huntsman Company was employed. In the producing process, 35 grams catalyst Dabco T-12 (dibutyl tin dilaurate) was added, which could accelerate gelling reaction and reduce the surface viscosity. After stirring for 10 min at 60 rpm, 250 grams of 2-Butoxyethanol were added therein and continuously stirred for 20 minutes at 25 rpm.

A Precursor C-MEG

In a closed vessel with nitrogen, 8,000 grams of Rubinate 1860, 3,000 grams of Rubinate M and 1,000 grams of Rubinate 1680 were mixed well at room temperature. Rubinate 1680 is uretoinime modified isocyanate and can increase the elasticity of final products.

In the injection devices with negative pressure, the four independent tanks were respectively filled with A-MEG, B-MEG, C-MEG and cleaning solution. The injection mixing lasted for 15 seconds, and the injection mixing rate was 2,500 rpm. The size of mould was 1,346×914×609 mm (length×height×width), which was made of wood and lined with mica. The mould had a bottom, but no top so that materials could be injected and foaming freely. The four sides of mould were fastened with a hinge and a locker. The injection was controlled under computer software with three flow controlling displays.

Total injection materials:
Precursor A-MEG=3,600g.
Precursor B-MEG=365 g.
Precursor C-MEG=5,200 g.

The mixture expanded after 4 seconds extruded out from the dynamic mixer, and then needed 90 seconds for finishing expansion. After 175 seconds the foam could be touched without sticking hands. A thermocouple was inserted into the materials at foaming stage to measure accurately the inner temperature of materials. The inner temperature of the foams was up to 127° C. In order to measure the temperature timely a thermocouple with a diameter of 0.0125 mm was used. The miniature probe had a little thermal inertia without any effects on the foams. After the materials were extruded, the foams needed 20 minutes for curing. Then the foams were put in an oven at 160° C. for 30 minutes; then increased the temperature to 225° C., and kept the foam in this oven for 1.5 hours.

Figures 1, 3:
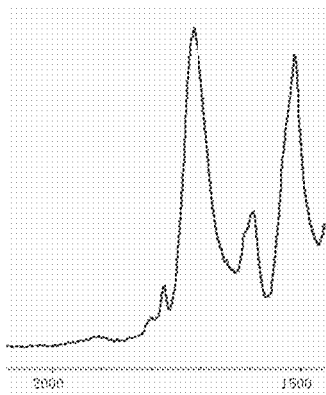

The final density of the foams was 55.5 kg/m$^3$ according to ASTM D-3574 A. From FIG. 3-2a, after magnified for 40 times we can see the foam structure was very uniform. From FIG. 3-2b, after magnified for 100 times we can see the foam was almost closed structure. The infrared spectrum (FIGS. 14 and 3-1) showed that foams had been completely imidized.

Embodiment 4

A method for preparing polyimide foams with intermittent closed mould.

The process of preparation and curing were the same as embodiment 3. The injection time was 20 seconds, the stirring rate was 2,500 rpm. The size of the mould was 1,346×914×609 mm (length×height×width). In the process of producing the precursor B we added 600 grams of PEG The precursor was named as precursor B-PEG The materials expanded after 8s from extruded out of dynamic mixer. Then the foaming needs 80s for finishing the expansion. After 230 seconds the surface of the foams could be touched. The inner temperature of foams was up to 110° C.

Precursor A-PEG=3,000 g.
Precursor B-PEG=9,65 g.
Precursor C-PEG=6,100 g.

Figures 1, 4:
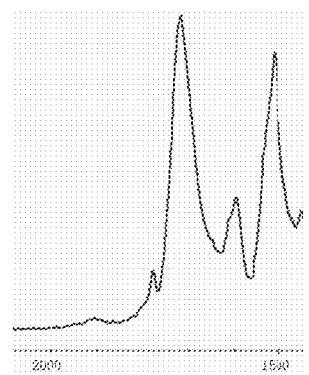
Figures 1, 2, 2A:
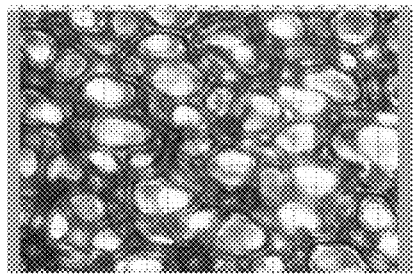
Figures 1, 2, 2B:
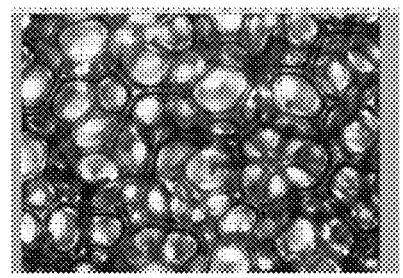
Figures 2, 2A:
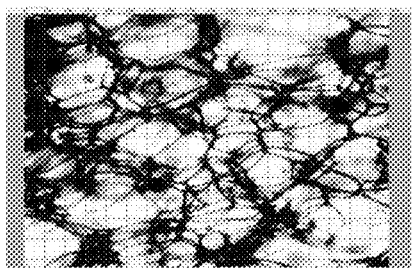
Figures 2, 2B:
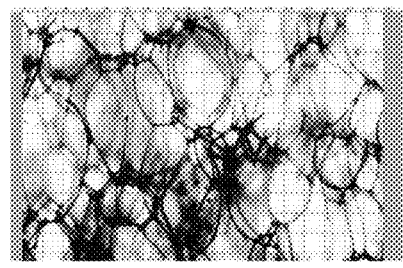
Figures 2A, 3:
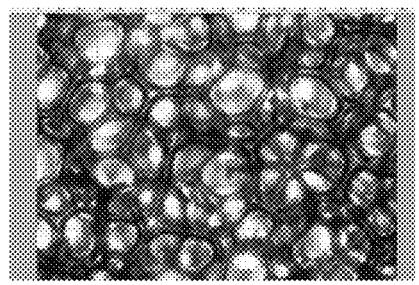
Figures 2B, 3:
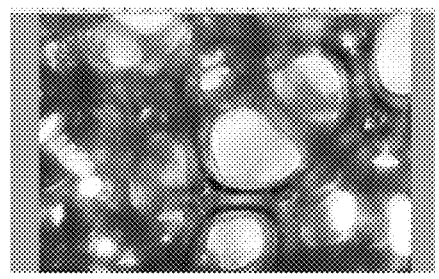
Figures 2A, 4:
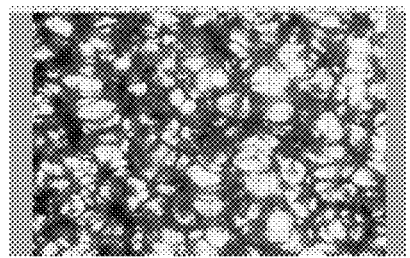
Figures 2B, 4:
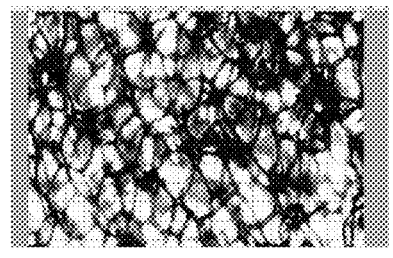

The foam density was 115 kg/m3. The foams had good flexible elasticity observed from parallel and vertical direction. The foams structure could be seen in FIGS. 4-2 and 4-2b. The infrared spectrums (FIGS. 14 and 4-1) showed that the foams had been completely imidized.

The above examples were the preferable embodiments of the invention, were not limited to the scope of the invention. All modifications and equivalent arrangements according to the features and principles described in the invention document should belong to the scope of the invention claims.

In the examples of the invention, it need select four groups of equipment in order to make the process working efficiently and practically. The first of group of devices were used to produce precursors. This devices were 3 tanks with an oil bath Jacket and with the spinning paddle mixer. The mixer had a speed controlling system; the inner wall of tank was made by the stainless steel, the oil bath temperature could be controlled from room temperature to 320° C. In producing process, it need monitor the system temperature change in whole process. During preparing solutions or suspensions, the system temperature increased; when the temperature reduced, the cooling rate should be controlled to avoid crystallizing therefore obtaining a uniform and transparent solution. The second device was a dynamic mixer with four injection heads. First three of them were used for adding materials; the last one was used for adding pure water or solvent and air for cleaning. The soft tube connecting the tank and the injection mixer need to be equipped with a heating system for reducing the viscosity of precursor A, so the mixture could immediately react after being mixed together. The mixing process was driven by a H4125 type gear pump made by Viking Pumps Company, which was controlled by software to promise the proportion of the adding materials. The third group of device was heating furnace produced by Blue M Company for intermittent process. The initial temperature was 160° C. until, and when the system was completely imidized, it increased to 240° C. The temperature scope could be appropriately adjusted according to the thickness of materials. The last group of device was a continuously production line for making the polyimide foams. The mixture was injected into the bottom belt, the up surface of the bottom belt and the down surface of the top belt were heated up to some temperature thereby finishing the last imidization. The distance between the top and the bottom belts could be adjusted according to the thickness of materials. The conveyor belts were contacted with the aluminum hot plates for controlling the temperature. The hot plates could be heated by cycling the hot oil from and to a hot oil bath.

What is claimed is:

1. A method for continuously preparing open-cell or closed-cell polyimide foams, the method comprising:
    (1) preparation of precursors,
        preparation of a precursor A: firstly heating polyhydric alcohol and polar cosolvent to a temperature of 50° C.±5° C. in a reactor, then adding aromatic dianhydride thereto and mixing them well, then increasing the inner temperature of said reactor to 140° C.~180° C. and keeping said temperature until polar cosolvent therein is completely volatilized, and finally the precursor A being obtained; the quantity of said aromatic dianhydride added in being 75%~150% of that of said polyhydric alcohol;
        preparation of a precursor B: according to mass portion, 100 portions of polyethylene glycol, 20~200 portions of water, 0.1~20 portions of catalyst, and 2~30 portions of surfactant being mixed well, and then said precursor B being obtained;
        a precursor C being selected from a group consisting of diphenyl-methane-diisocyanate (MDI), toluene diisocyanate (TDI), 1,6-diisocyanatohexane (HDI), isophorone diisocyanate (IPDI), and any combination thereof;
    (2) foaming,
        dynamically mixing said precursor A, said precursor B, and said precursor C in mass ratio 3.1~11.4:1:6.3~14.3, at the same time, a foaming agent being added thereto, mixing speed thereof being in a range of 1200~2500 r/min, and said precursor A being heated to a temperature in a range of 40° C.~50° C. before mixing;
    (3) solidification,
        a material, obtained in the foaming process by the dynamically mixing of said precursor A, said precursor B, said precursor C, and said foaming agent, being injected into a continuous transmission double-side conveyor belt and then solidified to obtain the polyimide foams.

2. The method for preparing polyimide foams according to claim 1, wherein in the process of preparing said precursor A, said polyhydric alcohol is selected from a group consisting of ethylene glycol, polyethylene glycol, propanediol, glycerol and any combination thereof;
    said aromatic dianhydride is selected from a group consisting of pyromellitic acid dianhydride (PMDA), 3,3', 4,4'-benzophenone tetracarboxylic dianhydride (BTDA), 4,4'-Oxydiphthalic anhydride (ODPA), 4,4'-biphenyltetracarboxylic di-anhydride (BPDA) and any combination thereof.

3. The method for preparing polyimide foams according to claim 1, wherein in the process of preparing said precursor A, said polar cosolvent can be added in before adding the aromatic dianhydride, the quantity of said polar cosolvent added in is 5%~20% of that of said polyhydric alcohol.

4. The method for preparing polyimide foams according to claim 3, wherein in the process of preparing said precursor A, said polar cosolvent is methanol, alcohol, propanol, isopropanol, butanol, isobutanol, or pentanol.

5. The method for preparing polyimide foams according to claim 1, wherein in the process of preparing said precursor A, ultrasonic wave is adopted to stir and disperse with a frequency of 20~40 KHz.

6. The method for preparing polyimide foams according to claim 1, wherein in the process of preparing said precursor A, diamine can be added according to requirement; said diamine is selected from a group consisting of 4,4'-diamino diphenyl ether, 3,4'-diamino diphenyl ether, m-phenylenediamine, p-phenylene-diamine, 1,3-bis-(3-aminophenoxy) benzene, 4,4'-diaminobenzophenone, 4,4'-diamino-diphenylsulfone, other aromatic diamine and any combination thereof; the quantity of said diamine added in is 5%~20% of that of said polyhydric alcohol.

7. The method for preparing polyimide foams according to claim 1, wherein in the process of preparing said precursor B, said catalyst is amine catalyst, said surfactant is silane.

8. The method for preparing polyimide foams according to claim 1, wherein in the process of preparing said precursor B, 5~40 portions of flame retardant can be added.

9. The method for preparing polyimide foams according to claim 1, wherein in the process of foaming, no said foaming agent is used or only a small quantity of auxiliary foaming agent is used for reducing density thereof; said auxiliary foaming agent is selected from a group consisting of methanol, alcohol, acetone, water, 2-butoxylethanol, HFC 245A, 2-Butoxyethanol, 1,1-difluoroethane, triethylaMine, tetrahydrofuran and any combination thereof.

10. The method for preparing polyimide foams according to claim 1, wherein in the process of foaming, said dynamically mixing means that an agitator in said reactor containing said precursor A is kept on with a rotation speed in a range of 10~30 rpm before mixing the three kinds of precursors.

11. The method for preparing polyimide foams according to claim 1, wherein in the process of said solidification, said precursor A, said precursor B, and said precursor C are firstly dynamically mixed, and then the material obtained by said mixing is injected into the continuous transmission double-side conveyor belt to solidify, a top and a bottom of said belt need to be heated to a temperature in a range of 180° C.~190° C.; two pieces of kraft paper are respectively fixed on a up-side and a down-side of said belt, a gap between said up-side and said down-side of said belt and a length of said belt can be adjusted according to the product requirements.

12. The method for preparing polyimide foams according to claim 11, wherein said kraft paper is replaced by leather for continuously preparing foam sandwich composite material.

* * * * *